(No Model.)
G. H. DIMOND & W. F. DIAL.
POWER TRANSMITTING FRICTION CLUTCH PULLEY.
No. 582,851.  Patented May 18, 1897.
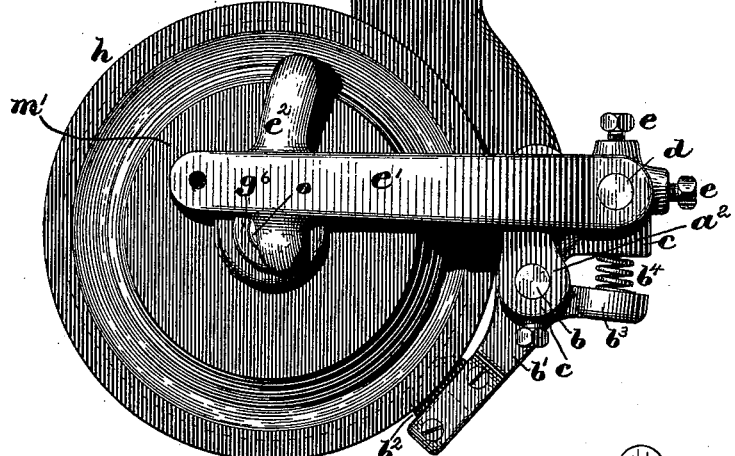
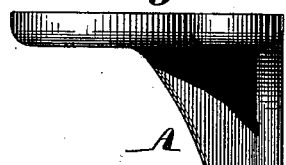
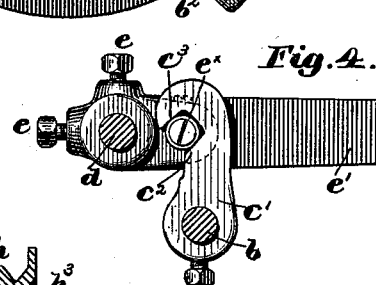
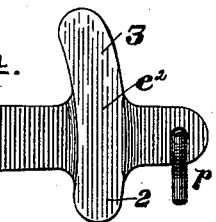
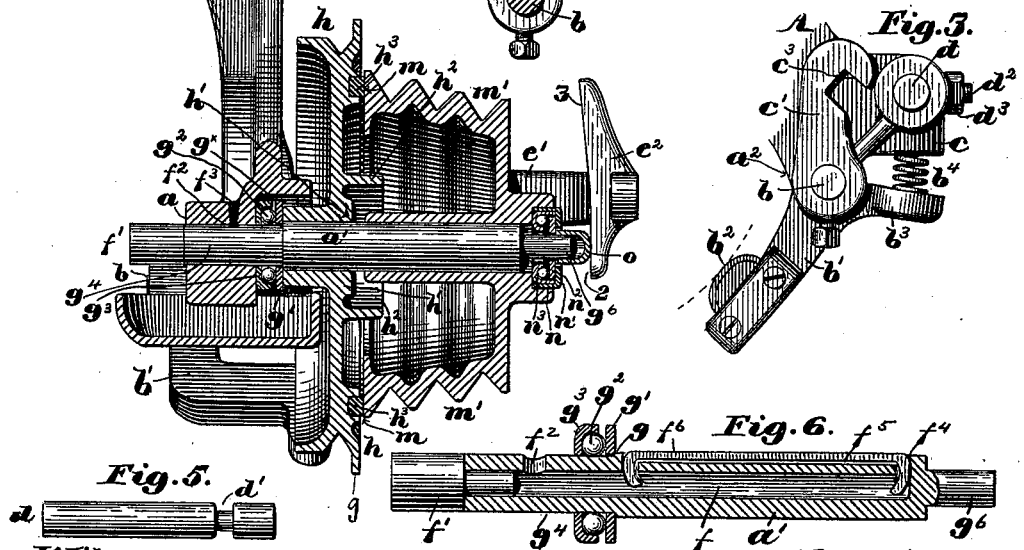
Witnesses:
Walter S. Lombard.
Edward F. Allen.
Inventors:
George H. Dimond,
Wilbur F. Dial,
by Crosby Gregory Attys.

UNITED STATES PATENT OFFICE.

GEORGE H. DIMOND AND WILBUR F. DIAL, OF BRIDGEPORT, CONNECTICUT, ASSIGNORS TO THE WHEELER & WILSON MANUFACTURING COMPANY, OF SAME PLACE.

POWER-TRANSMITTING FRICTION CLUTCH-PULLEY.

SPECIFICATION forming part of Letters Patent No. 582,851, dated May 18, 1897.

Application filed March 26, 1896. Serial No. 584,956. (No model.)

*To all whom it may concern:*

Be it known that we, GEORGE H. DIMOND and WILBUR F. DIAL, of Bridgeport, county of Fairfield, and State of Connecticut, have invented an Improvement in Power-Transmitting Friction Clutch-Pulleys, of which the following description, in connection with the accompanying drawings, is a specification, like letters and figures on the drawings representing like parts.

This invention has for its object the production of an improved friction-clutch-pulley mechanism for transmitting and controlling power, our improvements rendering the same operable with less fatigue to the operator and enabling the parts to be better and more quickly controlled, the pulleys having antifriction thrust-bearings having balls or rolls to thereby enable the pulleys to be run with the minimum of friction.

In mechanisms of the class referred to it has been customary by the movement of a lever to press the two pulley parts together, so that one may drive the other, the movement of said lever also acting to remove a brake from the driving-pulley, and the brake in its releasing movement compresses a spring, so that the operator, to keep the pulley running, must continually hold the lever against the stress of the said spring. This holding of the lever against the spring is very fatiguing and frequently produces results harmful to the operator.

In operating the old forms of friction-clutches the power consumed in overcoming the friction created at the "thrust" ends of the device is greater than that necessary to drive the machine. The introduction of antifriction thrust-bearings, as in our device, saves this great loss of power.

In our invention we have employed antifriction thrust-bearings at opposite ends of the combined pulleys, and we have combined with the lever for controlling the pressure an auxiliary lever which controls the brake, so that the first movement of the pressure-controlling lever quickly releases the brake, leaving it at rest, where it will remain without effort on the part of the operator, and thereafter, by further movement of the pressure-controlling lever, any desired degree of pressure may be exerted, thereby controlling the speed, the lever remaining practically in any position in which it may be put by the operator, thus relieving him from the necessity of exerting strain through the leg to keep up the pressure.

One part of our invention consists in a driving and a driven pulley having friction-faces, means to sustain said pulleys, an antifriction thrust-bearing for one end of the hub of the driven pulley, and an antifriction thrust-bearing at one end of the driving-pulley, combined with means to force the said pulleys together, whereby the said pulleys when pressed together are free to run between the rolls or balls of the said thrust-bearings, substantially as will be described.

Other features of our invention will be hereinafter specified, and more particularly pointed out in the claims.

Figure 1, in side elevation, shows a clutch-pulley mechanism embodying our invention. Fig. 2 is a section through the pulleys and the stand. Fig. 3 is a detail showing the brake device. Fig. 4 is a detail showing the inner side of the pressure-controlling lever and a part of the brake device with which it coöperates; Fig. 5, a detail of shaft $d$; and Fig. 6 shows the stud $a'$ enlarged, with an antifriction thrust-bearing on it.

The stand or bracket A is and may be of any usual or suitable construction, it, as shown, having a bearing $a$ to receive the stud $a'$, on which rotate the pulley parts, to be described. The stand or bracket also has a second bearing $a^2$, which, as shown, receives a rock-shaft $b$. This rock-shaft has attached to it at one end an arm $b'$, provided with a friction-pad $b^2$ to at times bear against the driven pulley, to be described, the arm also having, as herein shown, a projection $b^3$ to support one end of a spring $b^4$, the opposite end of said spring resting against a lug $c$, which may have a recess to receive said end. The rock-shaft $b$ has also, as herein shown, attached to it an arm $c'$, having, preferably, a cam portion $c^2$, and also, preferably, a heel $c^3$, the said arm $b$, rock-shaft, and arm $c'$ constituting one form of brake device. The stand or bracket also supports, as herein shown, loosely a short shaft $d$, said shaft (shown in Fig. 5) having an annular groove $d'$, which is entered by the point of a suitable screw, as $d^2$, screwed into a part of the stand and held in adjusted position by a suitable set-nut $d^3$.

The short shaft $d$ has fixed on it, by one or more suitable set-screws $e$, a pressure-controlling lever $e'$, the same having a segmental face $e^2$, a portion of which presents a plane or vertical surface, as at 2, and an inclined surface, as at 3, said lever also having extended from it a roller or other stud $e^\times$, which extends over the cam-faced portion of the arm $c'$, the parts being so placed that when the roller or stud has moved down on arm $c'$ to release the brake and compress the spring the pressure of the latter is exerted against the stud substantially in line with center or fulcrum $d$, so that the stud is on a dead-center relatively to the thrust of the brake.

The stud $a'$ is herein shown as made hollow from one nearly to its opposite end to leave an oil-chamber $f$, one end of the oil-chamber being stopped by a plug $f'$. This stud has at one side an oil-inlet $f^2$, which when the stud is in place in the stand or bracket is in communication with an oil-hole $f^3$ in the said stand or bracket, thus enabling the oil-chamber to be filled. The stud is further provided at its top side with a long slot $f^4$, in which is placed a suitable oil-absorbent $f^5$—such, for instance, as a wick—and preferably thereafter the wick is covered in the said slot by a strip of leather $f^6$. The stud has a shoulder $g$, against which revolves loosely a washer $g'$, said washer at its outer side bearing and running against a series of rolls or balls $g^2$, held, as shown, in a ball-cup $g^3$, forced on a reduced portion $g^4$ of the said stud. The said ball-cup enters a recess $g^\times$ in the stand or bracket. The stud receives on it the driven pulley $h$, the outer end of the hub of said pulley resting against the said washer $g'$.

At the interior of the pulley there is a hub end $h'$, surrounded by a flange $h^2$, and the inner side of the said pulley has, as shown, a leather or other suitable friction-face $h^3$, which is acted upon with more or less pressure by the friction-face $m$ of the driving-pulley $m'$, made, as shown, as a hollow shell and provided externally with band-grooves of different diameters to thus gain the requisite speed. This driving-pulley has its hub provided with an antifriction thrust-bearing, to be described, which surrounds the reduced portion $g^6$ of the stud.

The thrust-bearing of the driving-pulley is composed, as shown, of a ring $n$, having a flanged end $n'$, and inside this ring is a loose washer $n^2$ and a fixed ball-cup $n^3$, and a series of rolls or balls are placed between the washer and ball-cup, the washer being exposed through the flange of the ring at the outer end of the driving-pulley. This ring is forced into the bore of the hub of the driving-pulley, and it and its contents always rotate with the rotating driving-pulley.

The reduced end $g^6$ of the stud is provided with a loose thimble $o$, the inner end of which bears against the loose washer $n^2$, and the outer end of this thimble is borne against with more or less pressure by the face of the segment.

The outer end of the pressure-controlling lever has connected to it a rod $p$, partially shown, which is joined at its opposite end to a treadle pivoted between its ends, so that the depression of the inner end of the treadle will pull the lever down and the depression of the outer end of the treadle will raise the lever. Normally the arm will be elevated, as in the drawings, and in this condition the substantially vertical part 2 of the segment will be opposite the end of the thimble $o$, and at the same time the roller-stud $e^\times$ will rest at the upper end of the cam-surface $c^2$ and between it and the heel $c^3$, leaving the spring $b^4$ free to act and force the pad $b^2$ against and so as to act as a brake for the driven pulley.

To start the driven pulley, the operator will depress the lever $e'$, and it, in the first part of its movement, will act on the cam-surface $c^2$ and will move the brake device to remove the pad from contact with the pulley $h$, and this movement also compresses the spring $b^4$, but the stress of the spring is not exerted to lift the lever, as heretofore, owing to the location and position of the roller-stud $e^\times$, and thereafter by further depressing the said lever the inclined face 3 of the segment pushes on the thimble and causes it to bear on the loose washer $n^2$, forming part of the thrust-bearing of the pulley $m'$, and force the said pulley against the inner side of the pulley $h$, to be driven by it, the outer end of the hub of the latter pulley being pressed against the loose washer $g'$ of the inner thrust-bearing, the faces of the two pulleys being thus pressed together firmly, so that the driving-pulley will turn the driven pulley with it, the two pulleys running freely as one on the said stud between the antifriction thrust-bearings.

By pressing down the heel end of the treadle hard the roller-stud will act on the heel $c^3$ and cause the pad to be forced against the driving-pulley with a force in excess of the strength of the spring.

This invention is not limited to the particular means shown to support the pulleys.

Having described our invention, what we claim, and desire to secure by Letters Patent, is—

1. A driven pulley, a support for it; a driving-pulley, a support for it, and a brake device to coöperate with the said driven pulley; combined with a separate pressure device for clutching the driving and driven pulleys independent of said brake device, but connected therewith to operate the latter, said connection being substantially on a dead-center with said brake when the latter is released from braking position, whereby the latter is without tendency to move the pressure device, substantially as described.

2. The driving-pulley, a support for it, a driven pulley, a support for it, and a brake device to coöperate with the said driven pulley, combined with an independent pressure device separate from the said brake device having a segment provided with a straight and an inclined face, to force the said pulleys in driving contact and to effect the release of the said brake device during the first part of the movement of the said pressure device, substantially as described.

3. The driven pulley, a support for it, an antifriction thrust-bearing against which it runs, a driving-pulley having an antifriction thrust-bearing, a support for said pulley, and a brake device, combined with an independent pressure-lever having an inclined face, said lever being separate from and having means to actuate said brake device, substantially as described.

4. The stud or shaft, an antifriction-bearing carried thereby, and the loose driven pulley on said stud or shaft, combined with the driving-pulley having secured in its hub an antifriction thrust-bearing composed of a flanged collar, a washer, a ball-cup, and a series of balls, and a thimble surrounding one end of said stud or shaft, and acting against the loose washer in the driving-pulley, and a pressure-controlling lever, to operate, substantially as described.

In testimony whereof we have signed our names to this specification in the presence of two subscribing witnesses.

GEORGE H. DIMOND.
WILBUR F. DIAL.

Witnesses:
ISAAC HOLDEN,
G. H. CORNWELL.